Oct. 24, 1950      A. L. SMITH      2,526,977

MAGNETIC FLAW DETECTING DEVICE

Filed Aug. 7, 1947      2 Sheets-Sheet 1

Inventor
ARTHUR L. SMITH
By C. G. Stratton
Attorney

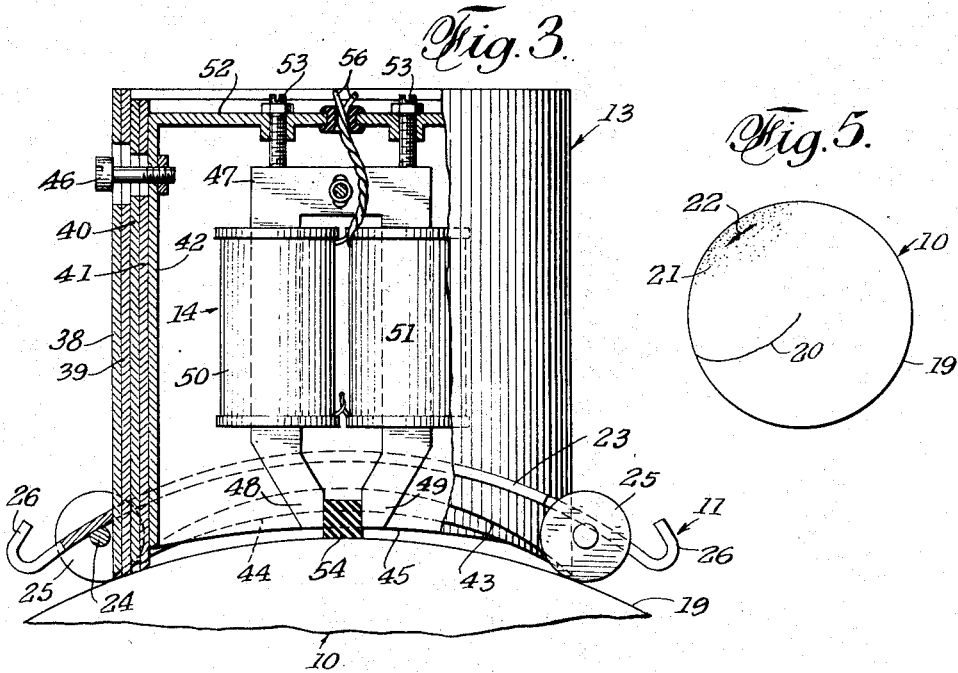
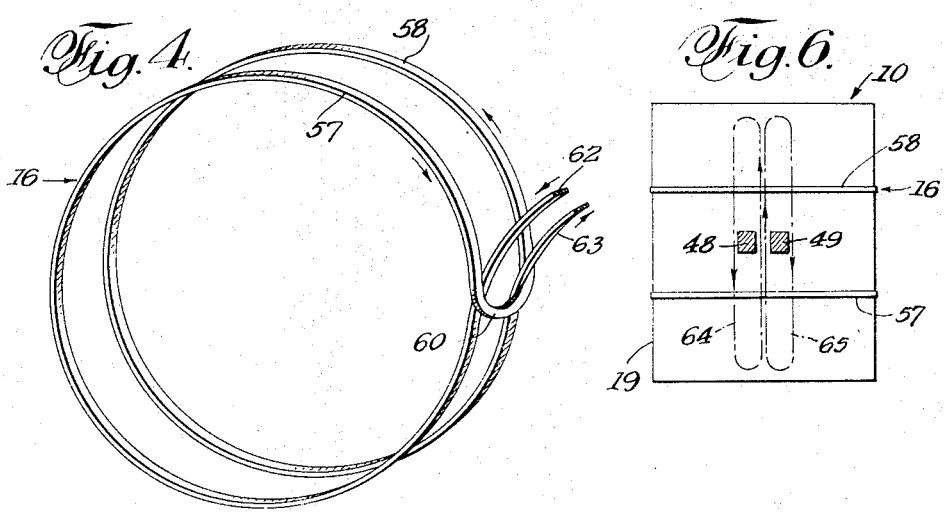

Patented Oct. 24, 1950

2,526,977

UNITED STATES PATENT OFFICE 2,526,977

MAGNETIC FLAW DETECTING DEVICE

Arthur L. Smith, Torrance, Calif., assignor of one-half to Louise T. Leslie, Tujunga, Calif.

Application August 7, 1947, Serial No. 767,156

9 Claims. (Cl. 175—183)

This invention relates to means for detecting flaws in cylindrical objects, such as crank pins, for instance, and deals more particularly with simple, effective and improved means for detecting those flaws that have developed after such objects have been subjected to stresses in use.

For a clearer understanding of the present invention, the crank pin of a locomotive drive wheel will be used as a typical member adapted to be tested for flaws by the device of this invention. Such a pin is usually formed by forging the same from a flat bar or plate and, when completed in its cylindrical form, has a generally radial infoldment line. An object of this invention is to provide flaw detecting means which will ignore such an infoldment line since the same is inherent in the pin structure and is not a flaw that has developed in use.

Further, a locomotive crank pin frequently develops fatigue areas which, however, do not materially impair the strength of the pin. Such areas have little or no definition with respect to the mass of the pin and are usually spread over substantial areas of the pin. Another object of the present invention is to provide flaw detecting means of such high sensitive selectivity that the same will not be affected by such fatigue areas.

Fatigue areas of the nature above indicated, eventually crystallize, resulting in one or more definite fractures that do materially affect the strength of the pin. It is the primary object of this invention to provide means for detecting such flaws and also to accurately locate the same to thereby determine the advisability of continuing the pin in use, discarding the same, or correcting the flaw by suitable heat treatment.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 3 is an enlarged sectional view, partly in elevation, of a carriage embodying electro-magnetic means employed in the device.

Fig. 4 is a perspective view of a pickup loop shown in Fig. 1.

Fig. 5 is a semi-diagrammatic end view of a pin showing types of flaw hereinafter discussed.

Fig. 6 is a plan view thereof, showing the relationship between the pickup loops in place on the pin and secondary alternating currents induced by the electro-magnetic means.

Figure 1:
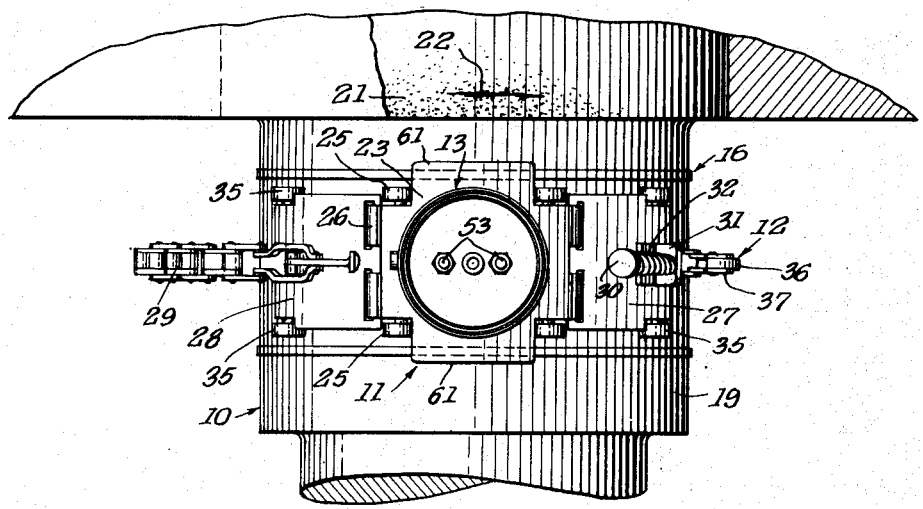
Fig. 1 is a top plan view of a flaw detecting device according to the present invention, and shown applied to a crank pin.

In that embodiment of the invention which is illustrated, the pin 10 has mounted thereon a carriage 11 arranged to track around the peripheral surface of the pin, means 12 connected to the carriage and encircling the pin whereby said tracking is readily effected, a telescoping tubular structure 13 mounted on the carriage, an electro-magnet 14 adjustably carried thereby, said tubular structure comprising a shield for the magnet, means 15 for energizing said magnet, a pickup loop 16 on the pin 10 on either side of the magnet 14, amplifying means 17 for currents generated or induced in said loops by the magnetic field of said magnet, and means 18 for indicating the variations in current in said pickup loop 16.

The surface 19 of the pin 10 is cylindrical and, as indicated at 20 of Fig. 5, may have an infoldment seam formed during forging thereof, said seam extending longitudinally throughout the length of the pin. Said pin, as indicated at 21 of Figs. 1 and 5, may have fatigue areas or crystallization spots that have indeterminate definition and size. At 22 are indicated flaws, such as fractures, that are to be detected by the instant device.

The carriage 11 comprises an arcuately formed plate 23 which is provided with axles 24 at either end. Wheels 25 are mounted on said axles in a manner to allow the carriage to track around the peripheral surface 19 of pin 10. Said plate, at each end, is provided with reversely bent hooks 26 that connect with the means 12.

Figure 2:
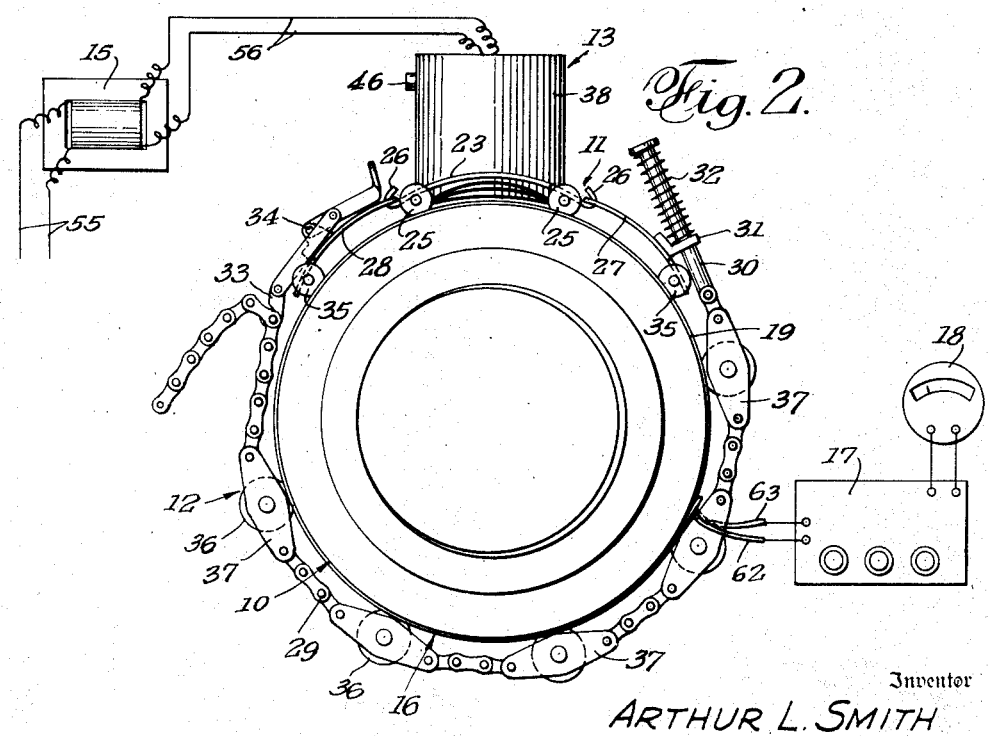
Fig. 2 is an end view thereof.

The means 12 is shown as comprising a plate 27 connected with hooks 26 on one side of the carriage, a similar plate 28 connected with the hooks on the other side, and a link chain 29. The latter, by means of a stem 30 extending through a bracket 31 on plate 27 and a compression spring 32 around the stem, connects one end of chain 29 to the latter plate. The other end of the chain is engaged by a hook 33 on an over-center locking toggle 34 carried by plate 28. The outer end of each plate 27 and 26 is provided with rollers or wheels 35 similar to wheels 25 and uniformly dispersed throughout the length of the chain are provided rollers 36 mounted in chain-link connecting brackets 37. It is evident that the carriage is readily mounted on the pin in the tracking position of Fig. 2, by holding the carriage in place, tensioning spring 32 by pulling on chain 29, wrapping said chain around the pin, hooking one of its links in engagement with hook 33, and actuating the locking toggle 34 to retain the tension of said spring. The assembly thus provided will readily roll around the pin on wheels or rollers 25, 35 and 36.

The structure 13 is shown as comprising an outer sleeve or tube 38 of iron or steel and having an inner lining sleeve 39 of non-ferrous material, such as aluminum or brass, an intermediate ferrous sleeve 40 having a non-ferrous lining sleeve 41, and an inner ferrous sleeve 42. The number of sleeves may be varied but are preferably ferrous and non-ferrous, alternately, as shown, to form a shield that both absorbs any magnetic induction that may emanate from the magnet that is housed in structure 13 and weaken magnetic energy leakage. This shielding will be discussed more fully later herein. Inasmuch as pins may vary greatly in diametral size, the ends of the mentioned sleeves adjacent the pin, are concavely arched, the outer sleeve 38 being most deeply arched at 43, the intermediate sleeve 40 being formed with a flatter arch 44, and the inner sleeve 42 with a quite flat arch 45. Thus, by adjusting the sleeves, telescopically, the shielding may be effective for pins of varying diameter. The adjustment is maintained by means of a locking screw 46 extending through the walls of the sleeves.

The electro-magnet 14 comprises a laminated magnet core 47 of C-shaped form and having magnet poles 48 and 49 directed toward the open bottom of structure 13. Suitable energizing coils 50 and 51 are mounted on said poles and electrically connected in series. The poles 48 and 49 are inwardly directed toward each other, as shown, so that the gap therebetween is quite small for the purpose of intensifying the magnetic field flowing between them.

The magnet 14 is mounted on a top wall 52 of sleeve 42 and said magnet is adapted to be adjusted by means such as screws 53 extending through said wall, to bring the poles 48 and 49 to desired close proximity to the pin. However, to obviate physical contact of said poles and the pin, a dielectric block 54 is provided between the poles and projects below their bottom faces as in Fig. 3.

The means 15 is shown as a transformer that receives variable frequency 25- and 60-cycle standard line voltage alternating current from lines 55 and, through lines 56, sends low voltage, of the order of 10 or 12 volts, to coils 50 and 51. The current flowing in these coils induces a magnetic field across magnet poles 49 and 48, and said field penetrates that portion of pin 10 which is in close proximity thereto. It will be evident that this field is isolated within the shield formed by structure 13 to obviate the same influencing the pickup loops which are located on either side. Thereby, said field is effective only within the confines of said shield, the ferrous sleeves 38, 40 and 42 of the shield serving as inductors of magnetic leakage wherein any magnetic lines of force leaking thereinto will create an inclusive alternating current short circuit, and the non-ferrous sleeves 39 and 41 serving as magnetic absorbers.

The pickup loop 16 simply comprises insulated preferably flat-sectional ribbon or wire formed as spaced single or multiple turns 57 and 58 connected as at 60 and oppositely wound as best indicated in Fig. 4. It is for the purpose of insulating these turns from the primary magnetic field induced by magnet 14 that the shield structure is provided, and as a further shield the carriage is formed with laterally extending portions 61 that overstand said turns as in Fig. 1.

The end 62 of turn 57 and end 63 of turn 58 connect the pickup loop 16 to a suitable amplifier 17 in series for amplifying the voltage differential or potential in said turns and for transmitting such difference of potential to a suitable indicating means 18. The latter may be a galvanometer as shown, or may comprise an oscillograph of conventional form.

In practice, the primary magnetic field that flows in a generally circular path through poles 48 and 49 and pin 10 induces secondary currents that are indicated in Fig. 6 at 64 and 65. These induced currents travel an endless path around each pole end and have sufficient lateral extent to intersect turns 57 and 58. Where there is no or little structural change in the mass of the pin throughout the extent of said secondary currents, or where a fault such as seam 20 is parallel thereto, said currents will be alike and opposite to induce like and opposite fields in turns 57 and 58. Consequently, the reading of instrument 18 will not vary from a preset reading. However, as the device is tracked around the pin and the secondary currents encounter fatigue areas, and since said areas have little definition, the voltage balance of turns 57 and 58 will change more particularly when said fatigue areas are to one side of either turn 57 or 58. A slow, barely perceptible change in the reading of instrument 18 will occur.

Upon said secondary currents encountering a fault such as a fracture, considerable and abrupt unbalance of turns 57 and 58 occurs to materially change the reading of said instrument. Now, by watching the rise and fall of the reading and tracking as indicated, the fracture can be definitely located to lie on a medial line extending between the magnet poles. The reading will move in one direction when the magnet is moved and in the opposite direction when the magnet is oppositely moved.

It is evident that the device is effective for detecting fractures apart from other faults and inclusions that have no bearing on the strength of the pin being tested for flaws. It is for this reason that the magnet poles are placed in close proximity. When said poles enter a fatigue area, the indefiniteness of said area causes them to enter nearly simultaneously with little or no unbalance in the secondary currents. However, a fracture can be readily isolated between said secondary currents as hereinbefore indicated.

The sensitivity and effectiveness of the device for detecting flaws, as above indicated, is essentially due, among others, to two features of the construction. First, it will be recalled that the non-ferrous sleeves 39 and 41 serve as magnetic absorbers, the reason for this function being that their high conductivity act as shorted secondaries for the ferrous sleeves 38, 40 and 42 and, thereby, absorb magnetic leakage energy so that said latter sleeves alone will not be able to isolate. By adjusting the non-ferrous sleeves to contact the pin being tested, as shown in Fig. 3, the ferrous sleeves are spaced from said pin to obviate a too critical operation. Second, the mentioned small gap between the poles 48 and 49 enables the device to distinguish between fuzzy edged fatigue areas, crystallized areas and hard spots on one hand, and sharply defined fractures on the other for reasons hereinbefore mentioned.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A flaw detecting device for a cylindrical ferrous member, comprising an alternating current electro-magnet having poles arranged in close proximity to each other and to the outer peripheral surface of said member to create a magnetic field penetrating said outer surface of the latter, means mounting said magnet on said member to track around said peripheral surface whereby secondary alternating currents induced by said field and extending longitudinally of the member are progressively moved around the same, a pickup loop wound on the member on each side of said magnet, said loops being oppositely wound to retain their electrical balance when said secondary currents encounter a longitudinal flaw and to be unbalanced electrically upon said secondary currents encountering a flaw to one side of either loop, and means for reading the state of balance of the loops.

2. A flaw detecting device for a cylindrical ferrous member, comprising an alternating current electro-magnet having poles arranged in close proximity to each other and to the outer peripheral surface of said member to create a magnetic field penetrating said surface of the latter, a magnetic shield for said magnet, means mounting said magnet on said member to track around said peripheral surface whereby secondary alternating currents induced by said field and extending longitudinally of the member are progressively moved around the same, a pickup loop wound on the member on each side of said magnet, said loops being oppositely wound to retain their electrical balance when said secondary currents encounter a longitudinal flaw and to be unbalanced electrically upon said secondary currents encountering a flaw to one side of either loop, a shield movable with the magnet to overstand successive portions of the loops during movement of said magnet, and means for reading the state of balance of the loops.

3. A flaw detecting device for a cylindrical ferrous member, comprising an alternating current electro-magnet having poles arranged in close proximity to each other and to said member to create a magnetic field penetrating the latter, a magnetic shield for said magnet, said shield comprising a plurality of telescoped tubes surrounding the magnet, said tubes being alternately ferrous and non-ferrous, means mounting said magnet to track around the peripheral surface of said member whereby secondary alternating currents induced by said field and extending longitudinally of the member are progressively moved around the same, a pickup loop wound on the member on each side of said magnet, said loops being oppositely wound to retain their electrical balance when said secondary currents encounter a longitudinal flaw and to be unbalanced electrically upon said secondary currents encountering a flaw to one side of either loop, and means for reading the state of balance of the loops.

4. A flaw detecting device for a cylindrical ferrous member, comprising an alternating current electro-magnet having poles arranged in close proximity to each other and to said member to create a magnetic field penetrating the latter, means mounting said magnet to track around the peripheral surface of said member whereby secondary alternating currents induced by said field and extending longitudinally of the member are progressively moved around the same, said latter means comprising a wheel-mounted carriage for the magnet and a chain embodying rollers and connected to opposite sides of said carriage, a pickup loop wound on the member on each side of said magnet, said loops being oppositely wound to retain their electrical balance when said secondary currents encounter a longitudinal flaw and to be unbalanced electrically upon said secondary currents encountering a flaw to one side of either loop, and means for reading the state of balance of the loops.

5. A flaw detecting device for a cylindrical ferrous member, comprising an alternating current electro-magnet having poles arranged in close proximity to each other and to said member to create a magnetic field penetrating the latter, a magnetic shield for said magnet, said shield comprising a plurality of telescoped tubes surrounding the magnet, said tubes being alternately ferrous and non-ferrous, the ends of said tubes adjacent to the ferrous member being differently concavely arched whereby adjustment of said tubes may be effected to shield close to the peripheral surface of said ferrous member, means mounting said magnet to track around the peripheral surface of said member whereby secondary alternating currents induced by said field and extending longitudinally of the member are progressively moved around the same, a pickup loop wound on the member on each side of said magnet, said loops being oppositely wound to retain their electrical balance when said secondary currents encounter a longitudinal flaw and to be unbalanced electrically upon said secondary currents encountering a flaw to one side of either loop, and means for reading the state of balance of the loops.

6. In a flaw detecting device for a cylindrical ferrous member, an alternating current electro-magnet having magnet poles arranged in close proximity to each other, a shield for said magnet comprising relatively adjustable and alternately ferrous and non-ferrous telescoped tubes, said tubes having arcuate ends in proximity to said member for close shielding thereagainst, means adjustably mounting said magnet in said shield for adjusting the air gap between said poles and said ferrous member, and a wheel-mounted carriage fixed with said shield for tracking around said ferrous member to move the poles progressively over the peripheral surface thereof.

7. In a flaw detecting device for a cylindrical ferrous member, an alternating current electro-magnet having magnet poles arranged in close proximity to each other, a shield for said magnet comprising alternately ferrous and non-ferrous telescoped tubes, a dielectric member carried by the innermost tube and arranged between the poles to extend somewhat below the pole ends to thereby space said pole ends from the ferrous member, means adjustably mounting said magnet in said shield for adjusting the air gap between said poles and said ferrous member, and a wheel-mounted carriage fixed with said shield for tracking around said ferrous member to move the poles progressively over the peripheral surface thereof.

8. A flaw detecting device for a cylindrical ferrous member, comprising an alternating current electro-magnet having poles arranged in close proximity to each other and to said member to create a magnetic field penetrating the latter, means mounting said magnet to track around the peripheral surface of said member whereby secondary alternating currents induced by said field and extending longitudinally of the member are progressively moved around the same, said latter means comprising a wheel-mounted carriage for the magnet and a chain embodying rollers and connected to opposite sides of said carriage, tension take-up means at one connecting point of the carriage and chain to maintain the latter taut during tracking movement, a pickup loop wound on the member on each side of said magnet, said loops being oppositely wound to retain their electrical balance when said secondary currents encounter a longitudinal flaw and to be unbalanced electrically upon said secondary currents encountering a flaw to one side of either loop, and means for reading the state of balance of the loops.

9. A flaw detecting device for a ferrous cylindrical member comprising alternating current means applied only to the outer surface of said cylindrical member for generating a magnetic field penetrating said surface and movable progressively around said member, said alternating current means including a pair of magnet poles arranged transversely of said member, said magnet field inducing secondary alternating currents extending longitudinally of the member, a pickup loop around the member on each side of the pair of magnet poles of the alternate current means, said loops being oppositely wound across the path of movement of the secondary currents, and means connected in series with the loops for indicating variations in the current flowing in said loops whereby both no flaws and longitudinal flaws in said member indicate a state of electrical balance in said loop and whereby a flaw to one side of one loop indicates a state of electrical unbalance.

ARTHUR L. SMITH.

REFERENCES CITED

The following references are of record in the file of this patent:

UNITED STATES PATENTS

| Number | Name | Date |
|---|---|---|
| 1,893,074 | Drake | Jan. 3, 1933 |
| 2,010,813 | Dysart | Aug. 13, 1935 |
| 2,065,118 | Davis | Dec. 22, 1936 |
| 2,102,452 | Zuschlag | Dec. 14, 1937 |
| 2,124,579 | Knerr et al. | July 26, 1938 |
| 2,255,053 | Gunn | Sept. 9, 1941 |
| 2,353,211 | Zuschlag | July 11, 1944 |
| 2,388,843 | Howe | Nov. 13, 1945 |